US008824439B2

(12) United States Patent
Jiang et al.

(10) Patent No.: US 8,824,439 B2
(45) Date of Patent: Sep. 2, 2014

(54) COMBINATORIAL MOBILE HOTSPOT DEVICE AND NETWORK SERVICE PROVISION METHOD THEREOF, NETWORK ACCESS DEVICE AND WIRELESS SERVICE POWER SUPPLY DEVICE

(75) Inventors: Jung-Kuei Jiang, Taipei (TW);
Tai-Kaung Chiu, Zhongli (TW);
Chien-Chang Cheng, Tainan (TW)

(73) Assignee: Quanta Computer Inc., Taoyuan County (TW)

( * ) Notice: Subject to any disclaimer, the term of this patent is extended or adjusted under 35 U.S.C. 154(b) by 379 days.

(21) Appl. No.: 13/416,729

(22) Filed: Mar. 9, 2012

(65) Prior Publication Data

US 2013/0094485 A1    Apr. 18, 2013

(30) Foreign Application Priority Data

Oct. 18, 2011   (TW) .............................. 100137868 A

(51) Int. Cl.
*H04W 4/00*   (2009.01)
(52) U.S. Cl.
USPC .......................................... 370/338; 370/351
(58) Field of Classification Search
None
See application file for complete search history.

(56) References Cited

U.S. PATENT DOCUMENTS 8,443,063 B1 *  5/2013  Nelson et al. .................. 709/221
8,445,826 B2 *  5/2013  Verfuerth ...................... 250/205
8,723,642 B2 *  5/2014  Park et al. ...................... 340/5.8
2010/0027522 A1 *  2/2010  Mukai et al. .................. 370/338
2010/0232401 A1 *  9/2010  Hirsch ........................... 370/338
2011/0096726 A1 *  4/2011  Schlack ......................... 370/328
2012/0106527 A1 *  5/2012  Ichikawa et al. .............. 370/338
2012/0287857 A1 * 11/2012  Ku ................................. 370/328

FOREIGN PATENT DOCUMENTS

EP           1814016 A1    8/2007
JP       2011-217164 A    10/2011

OTHER PUBLICATIONS

English translation of abstract of JP2011-217184A (published Oct. 27, 2011).
Japan Office Action dated Aug. 6, 2013.
Huawei D100 Wireless Router User Guide; Sep. 19, 2008.
Taiwan Office Action dated Oct. 22, 2013.

* cited by examiner

*Primary Examiner* — Phirin Sam
(74) *Attorney, Agent, or Firm* — McClure, Qualey & Rodack, LLP

(57) ABSTRACT

This invention discloses a combinatorial mobile hotspot device, a network service provision method thereof, a network access device and a wireless service power supply device. The network access device has a mobile internet access ability to provide an external host machine connecting to a wide area network through the network access device when the network access device is selectively and electrically coupled to the external host machine. A mobile hotspot device is formed while the network access device is electrically coupled to the wireless service power supply device. The wireless service power supply device supplies the power to the network access device. Further, by a wireless local network transceiver, a plurality of electronic devices in the hotspot covering region are able to connect to wide area network through the wireless access point service provided by the network access device.

11 Claims, 5 Drawing Sheets

COMBINATORIAL MOBILE HOTSPOT DEVICE AND NETWORK SERVICE PROVISION METHOD THEREOF, NETWORK ACCESS DEVICE AND WIRELESS SERVICE POWER SUPPLY DEVICE

CROSS-REFERENCE TO RELATED APPLICATION

This application claims the benefit of Taiwan Patent Application No. 100137868, filed on Oct. 18, 2011, in the Taiwan Intellectual Property Office of the Republic of China, the disclosure of which is incorporated herein in its entirety by reference.

BACKGROUND OF THE INVENTION

1. Field of the Invention

The present invention relates to a mobile hotspot device, in particular to a combinatorial mobile hotspot device, a network service provision method, a network access device and a wireless service power supply device.

2. Description of the Related Art

As network technology advances, users generally use networks to obtain information or execute personal deeds or work. Since the present mobile network environment and technology tend to be mature, users can use various portable communication devices such as mobile phones, personal digital assistants (PDA) or tablet PCs for mobile networking and master required information anytime. Besides the portable wireless communication devices, various communication equipments for connecting to Internet become increasingly popular as the increase of use of networks. For example, a wireless access point for bridging the Internet and the portable communication device is primarily used as a router to plan the method and direction for transmitting data packets transmitted from various portable communication devices and transmitting the data packets through various network nodes to the destination, and such process is called routing. The aforementioned router is disposed at an intersection of two or more networks for transmitting the data packets between different ends according to a routing table. To achieve routing each data packet, routers communicate with each other through a routing protocol, and each router maintains its own routing table, such that data packets can be transmitted to the destination according to the protocol.

At present, a mobile hotspot device is available for providing an electronic device such as a computer or a mobile device to browse the Internet and establish a local area network data sharing. In general, the mobile hotspot is a router with a wireless wide area network (WWAN) such as 3G, LTE and Wimax and the local area network sharing function of wireless fidelity (Wi-Fi) protocol to allow electronic devices including smart phones, notebook computers and tablet PCs to access to the wireless wide area network simultaneously.

However, present existing mobile hotspot devices place WWAN components, Wi-Fi components and battery components in the same device. To fulfill user requirements for carrying conveniently, the mobile hotspot device generally comes with a compact design. Thus, the battery capacity of a power unit installed in the mobile hotspot device will be limited, so that the mobile hotspot device cannot be operated for a long time. When both WWAN components and Wi-Fi components are placed in the mobile hotspot device at the same time, the issue of electromagnetic interference arises. In addition, the design of placing all components into a device incurs a higher manufacturing cost and a poor heat radiation performance.

SUMMARY OF THE INVENTION

In view of the aforementioned problems of the prior art, it is a primary objective of the present invention to provide a combinatorial mobile hotspot device and a network service provision method thereof, a network access device and a wireless service power supply device to overcome the shortcomings including the low battery capacity, high electromagnetic interference, poor heat radiation and high manufacturing cost of the conventional mobile hotspot device.

To achieve the aforementioned objective, the present invention provides a combinatorial mobile hotspot device, comprising a wireless service power supply device and a network access device. The wireless service power supply device comprises a battery unit and a wireless local area network transceiver. The battery unit supplies operating power and stores external charging power. The wireless local area network transceiver has a wireless local area network (LAN) access ability. The network access device is selectively and electrically coupled to an external host machine or the wireless service power supply device. The network access device has a mobile Internet access ability for connecting to a wide area network. The network access device has a wireless access point service for operating and controlling the wireless local area network transceiver. Wherein, if the network access device and the external host machine are electrically coupled to each other, the external host machine is connected to the wide area network through the network access device. Wherein, if the network access device and the wireless service power supply device are electrically coupled to each other, the network access device receives the operating power supplied by the battery unit and enables the wireless access point service to operate and control the local area network transceiver to establish a mobile hotspot network, and the mobile hotspot network provides a plurality of electronic devices to exchange data and access to wide area network data.

Preferably, the network access device includes a wireless wide area network transceiver for connecting to a wide area network.

Preferably, the wireless access point service is a software control program. When the network access device is electrically coupled to the wireless service power supply device, the network access device is provided for coupling with and controlling the wireless local area network transceiver to establish a mobile hotspot network.

Preferably, the network access device includes a power management unit for receiving the power supplied by an external host machine or a wireless service power supply device.

Preferably, the wireless service power supply device includes a power recharging unit coupled to the battery unit for receiving the electric power supplied by a power supply device, and then storing the electric power into the battery unit.

Preferably, the network access device further includes a connection interface unit and a central processing unit, wherein the network access device is electrically coupled to an external host machine or a wireless service power supply device through the connection interface unit, and the central processing unit is provided for determining the connection interface unit to be operated in a host mode or a device mode of a dual working mode. Wherein, when the network access device is electrically coupled to the external host machine, the network access device is operated in the device mode. When the network access device is electrically coupled to the wireless service power supply device, the network access device is operated in the host mode.

Preferably, the connection interface unit includes a universal serial bus (USB) interface, a secure digital input/output (SDIO) interface or a high speed inter-chip (HSIC) interface.

Preferably, the wireless local area network transceiver includes a wireless fidelity (Wi-Fi) protocol.

To achieve the aforementioned objective, the present invention further provides a network service provision method of a mobile hotspot device, applied in a network access device and a wireless service power supply device. The network access device has a mobile Internet access ability for connecting to a wide area network. The wireless service power supply device has a wireless local area network access ability. The method comprises steps of: selectively and electrically coupling with the network access device to the wireless service power supply device or an external host machine; operating the network access device in a host mode of a dual working mode when the network access device is electrically coupled to the wireless service power supply device; supplying power to the network access device by the wireless service power supply device; and enabling a wireless access point service by a central processing unit of the network access device, for coupling with and operating a wireless local area network transceiver of the wireless service power supply device by the wireless access point service to establish a mobile hotspot network, and providing a plurality of electronic devices to exchange data and access to wide area network data by the mobile hotspot network.

Wherein, the network service provision method of the mobile hotspot device of the present invention further comprises following steps: operating the network access device in a device mode of the dual working mode when the network access device is electrically coupled to the external host machine; supplying the power to the network access device by the external host machine; and connecting the external host machine to a wide area network through the network access device.

To achieve the aforementioned objective, the present invention further provides a network access device comprising a connection interface unit, a central processing unit, a wireless wide area network transceiver and a wireless access point service. The connection interface unit is provided for electrically coupling to an external device. The central processing unit is provided for operating and controlling the network access device, and determining the connection interface unit to be operated in a host mode or a device mode of a dual working mode. The wireless wide area network transceiver has a mobile Internet access ability for connecting to a wide area network. The wireless access point service is a software control program operated together with a wireless service power supply device to selectively enable a software control function. Wherein, if the external device is the wireless service power supply device, the connection interface unit is operated in the host mode, and the wireless access point service is enabled to operate with the wireless service power supply device to establish a mobile hotspot network, and the mobile hotspot network provides a plurality of electronic devices to exchange data and connect to a wide area network. Wherein, if the connection interface unit is operated in the device mode, the external device may connect to a wide area network through the wireless wide area network transceiver.

To achieve the aforementioned objective, the present invention further provides a wireless service power supply device comprising a battery unit and a wireless local area network transceiver. The battery unit is provided for supplying power to an external device, or storing the power supplied by the external power supply. The wireless local area network transceiver has a wireless local area network access ability to provide a wireless local area network connection service to the external device, such that the external device has a wireless local area network access ability. Wherein, if the external device has a mobile Internet access ability and provides a wireless access point service, the wireless service power supply device and the external device are coupled to establish a mobile hotspot network, and the mobile hotspot network provides a plurality of electronic devices to exchange data and connect to a wide area network.

In summation of the description above, the combinatorial mobile hotspot device and the network service provision method thereof, the network access device and the wireless service power supply device of the present invention have one or more of the following advantages:

(1) The combinatorial mobile hotspot device primarily includes a wireless wide area network access function designed in the network access device, and includes a wireless local area network service function and power storage/supply function designed in the wireless service power supply device. Thus, the network access device can not only operate individually as a tool for users to connect an electronic device to the wide area network, but also operate with both of the network access device and the wireless service power supply device, if needed, making the combined device into a mobile hotspot device. The hotspot device provides a way of connecting a plurality of electronic devices in a local area network to the wide area network, such that the operation of the device of the present invention becomes more flexible and practical.

(2) Since the combinatorial mobile hotspot device disposes the wireless wide area network access components in the network access device, and local area network access components and power storage/supply components in the wireless service power supply device separately, so that the distance of an antenna connected to each component increases, electromagnetic interference can be improved effectively, and the communication performance of the combinatorial mobile hotspot can be enhanced. The separated design of each device provides a larger heat radiation area, so that the thermal issue can be improved effectively. The size of the wireless service power supply device can be increased to expand the battery capacity, so that the operating time may be increased when the wireless service power supply device and the network access device are used in combination. Moreover, the capacity of the mobile hotspot network service of the present invention can be expanded through the wireless local area network transceiver, so that the expanding flexibility wireless network service capacity can be increased. In addition, the network access device and the wireless service power supply device come with independent designs, so that the production process and manufacturing procedure can be processed in parallel and independently, and the manufacturing cost can be lowered.

DETAILED DESCRIPTION OF THE PREFERRED EMBODIMENTS

The technical characteristics of the present invention will become apparent with the detailed description of the preferred embodiments accompanied with the illustration of related drawings as follows. It is noteworthy to point out that the drawings are provided for the purpose of illustrating the present invention, but they are not necessarily drawn according to the actual scale, or are intended for limiting the scope of the invention.

Figure 1:
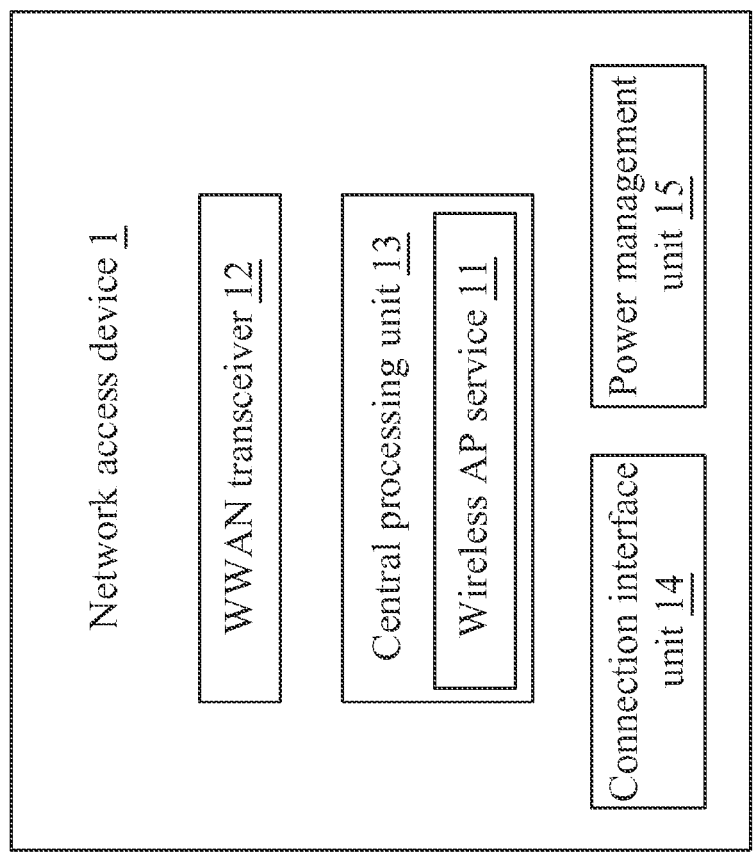
FIG. 1 is a schematic view of a network access device of the present invention.

With reference to FIG. 1 for a schematic view of a network access device of the present invention, the network access device 1 comprises a wireless access point (Wireless AP) service 11, a wireless wide area network transceiver 12, a central processing unit 13, a connection interface unit 14 and a power management unit 15. The connection interface unit 14 is provided for electrically coupling to an external device, and the connection interface unit 14 has a function of operating in either a host mode or a device mode of a dual working mode. Wherein, the specification of the connection interface unit may include a universal serial bus (USB) interface, a secure digital input/output (SDIO) interface or a high speed inter-chip (HSIC) interface. The wireless wide area network transceiver 12 and the central processing unit 13 can serve as a wireless wide area network access core module of the network access device 1. The central processing unit 13 can be software, a program or a firmware installed in the network access device 1 and an electronic device for operating the software, the program or the firmware. Wherein, the software, the program or the firmware is provided for determining a working mode when the connection interface unit 14 and the external device are coupled. The wireless wide area network transceiver 12 has a mobile Internet access ability for connecting to a wide area network, wherein the technology adopted by the wireless wide area network transceiver 12 includes a second generation mobile communication technology (2G), a third generation mobile communication technology (3G) or a worldwide interoperability for microwave access (WiMAX). The wireless access point service 11 can be software or a program operated in the central processing unit 13 and has a function of operating and controlling a wireless local area network transceiver to establish a wireless local area network and bridge a wide area network connected by the wireless wide area network transceiver 12. The enabling or disabling operation of the wireless access point service 11 is determined by the central processing unit 13 according to the working mode of the connection interface unit 14. The power management unit 15 is provided for receiving a power supplied by an external device, converting the voltage, and then supplying the power required by the electronic device of each assembly unit of the network access device 1.

As mentioned above, if the external device electrically coupled to the connection interface unit 14 of the network access device 1 is an external host machine such as a notebook computer, the central processing unit 13 determines that the connection interface unit 14 is operated in a device mode. In addition, the wireless wide area network transceiver 12 of the network access device 1 provides the external device with connecting a wide area network to access data on the wide area network.

Figure 2:
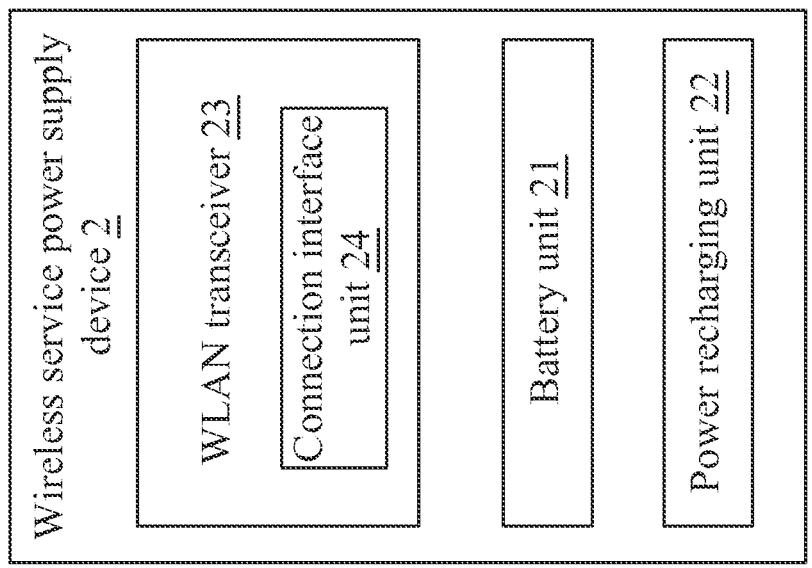
FIG. 2 is a schematic view of a wireless service power supply device of the present invention.

With reference to FIG. 2 for a schematic view of a wireless service power supply device 2 of the present invention, the wireless service power supply device 2 comprises a battery unit 21, a power recharging unit 22, a wireless local area network transceiver 23 and a connection interface unit 24. The wireless service power supply device 2 can be electrically coupled to an external device operated in a host mode through the connection interface unit 24, and the wireless local area network transceiver 23 and the external device are operated together to establish an operation ability of accessing wireless local area network. The interface specification of the connection interface unit 24 can be a universal serial bus (USB) interface, a secure digital input/output (SDIO) interface or a high speed inter-chip (HSIC) interface, but the working mode is restricted to the device mode only. The battery unit 21 is provided for storing power, and supplying the power to an external device, which can be a chargeable battery, but the invention is not limited to the chargeable battery only. The power recharging unit 22 is provided for receiving the power supplied by an external power supply device such as a power supply device, and storing the received power into the battery unit 21. The wireless local area network transceiver 23 has a wireless local area network access ability and is operated and controlled by an external device operated in the host mode, wherein the wireless local area network transceiver 23 includes a wireless fidelity (Wi-Fi) protocol.

As mentioned above, if the external device electrically coupled to the wireless service power supply device 2 is a notebook computer or a personal computer, the battery unit 21 of the wireless service power supply device 2 can receive and store the power supplied by the external device through the connection interface unit 24. For example, the external device inputs the electric power to the power recharging unit 22 through a direct current (DC) bus of the connection interface unit 24 and then stores the electric power into the battery unit 21. Now, the wireless local area network transceiver 23 of the wireless service power supply device 2 is also provided for connecting the external device to the local area network. However, the wireless service power supply device 2 can supply the power to the external device in a reverse order through the connection interface unit 24 and acts as a power supply device for supplying power.

As mentioned above, if the external device electrically coupled to the connection interface unit 14 of the network access device 1 as shown in FIG. 1 is the wireless service power supply device 2 as shown in FIG. 2, the assembly is the combinatorial mobile hotspot device of the present invention. The wireless service power supply device 2 supplies power to the network access device 1 by the battery unit 21 through the direct current bus of the connection interface unit 24. In addition, the power recharging unit 22 of the wireless service power supply device 2 can be supplied with the power by an external power supply device and store the power into the battery unit 21. The central processing unit 13 of the network access device 1 determines the connection interface unit 14 to be operated in a host mode, and activates a program of the wireless access point service 11. The wireless access point service 11 is connected to turn on the wireless local area network transceiver 23 to establish a wireless local area network and bridge the wireless local area network to a wide area network connected by the wireless wide area network transceiver 12. After the wireless local area network and the wireless wide area network are bridged with each other, the multiple electronic devices in the wireless local area network can be connected to the wide area network at the same time, or share and exchange data in the wireless local area network. This is the combinatorial mobile hotspot network of the present invention, and whose continuation and access of the network service have the same operating method and ability as the conventional mobile hotspot network.

Figure 3:
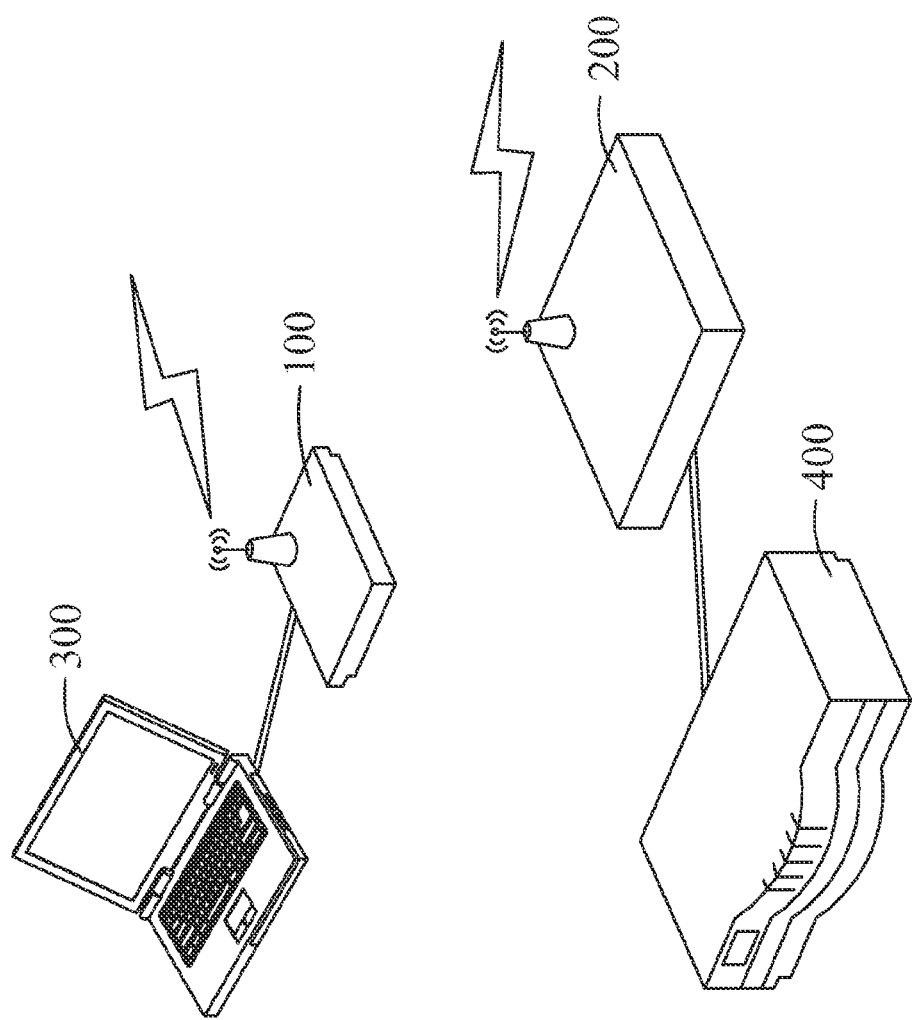
FIG. 3 is a schematic view, showing the independent operations of a network access device and a wireless service power supply device in accordance with a preferred embodiment of the present invention.

With reference to FIG. 3 for a schematic view, showing the independent operations of a network access device and a wireless service power supply device in accordance with a preferred embodiment of the present invention, the invention further comprises an external host machine such as a notebook computer 300 and an external device 400 in addition to the network access device 100 and the wireless service power supply device 200. The network access device 100 is built with a network communication technology including 2G, 3G or WIMAX to provide a mobile Internet access ability for connecting to a wide area network. If the network access device 100 and notebook computer 300 are electrically coupled to each other, the network access device 100 will determine itself to be operated in a device mode of a dual working mode for receiving power supplied by the notebook computer 300 and connecting the notebook computer 300 to a wide area network. As mentioned above, when the network access device 100 is operated in a device mode, the wireless access point service built in the network access device 100 will be disabled. Wherein, the network access device 100 and the notebook computer 300 are electrically coupled to each other through a universal serial bus (USB) interface, a secure digital input/output (SDIO) interface or a high speed inter-chip (HSIC) interface. The network access device 100 can be designed in form of a USB flash disk to facilitate carrying by a user. However, such arrangement is provided for illustrating the present invention only, but not intended for limiting the scope of the invention.

The wireless service power supply device 200 has a power storage function and a power supply function, and is disposed with a device for providing the Wi-Fi communication ability, so that the wireless service power supply device 200 has the wireless local area network access ability. The wireless service power supply device 200 is operated in a device mode of the dual working mode. If an external device 400 is connected, the external device 400 will supply the power to the wireless service power supply device 200. The wireless service power supply device 200 is also provided for connecting the external device 400 to a wireless local area network to access data in the wireless local area network. Wherein, the wireless service power supply device 200 can be electrically coupled to the external device 400 by using a universal serial bus (USB) interface, a secure digital input/output (SDIO) interface or a high speed inter-chip (HSIC) interface, but the invention is not limited to such arrangement only.

Figure 4:
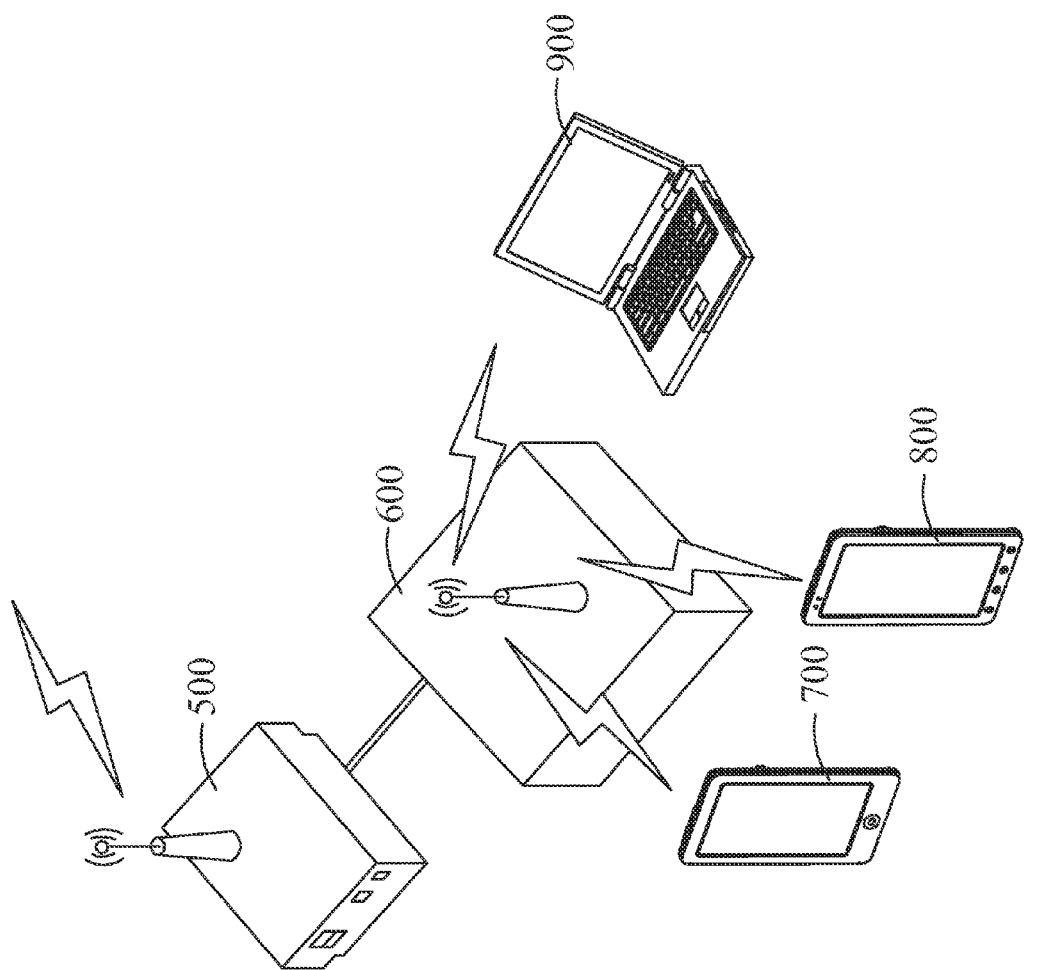
FIG. 4 is a schematic view of a combinatorial mobile hotspot device in accordance with a preferred embodiment of the present invention.

With reference to FIG. 4 for a schematic view of a combinatorial mobile hotspot device in accordance with a preferred embodiment of the present invention, the figure further shows three electronic devices 700, 800 and 900 in addition to a network access device 500 and a wireless service power supply device 600. The network access device 500 is built with a network communication technology including 2G, 3G or WIMAX and thus has a mobile Internet access ability for connecting to a wide area network. The network access device 500 further includes a wireless access point service for operating and controlling a wireless local area network to connect the wide area network. The wireless service power supply device 600 has an ability of power storage and power supply, and has a built-in device with the Wi-Fi communication ability, so that the wireless service power supply device 600 has a wireless local area network access ability. The network access device 500 and the wireless service power supply device 600 can be electrically coupled to each other through a universal serial bus (USB) interface, a secure digital input/output (SDIO) interface or a high speed inter-chip (HSIC) interface to become the combinatorial mobile hotspot device of the present invention. Now, the network access device 500 is operated in a host mode, and the wireless service power supply device 600 is operated in a device mode. If they are electrically coupled to each other, the wireless service power supply device 600 can be used for supplying power to the network access device 500 to maintain the operation of the network access device 500. The wireless service power supply device 600 and the network access device 500 are further operated together to enable a wireless local area network connection service to connect the three electronic devices 700, 800 and 900 as shown in the figure to a wireless local area network. Now, the wireless access point service of the network access device 500 is enabled to establish a channel between the wide area network and the wireless local area network for bridging data transmission between the wide area network and the wireless local area network, so that the electronic devices 700, 800 and 900 can be connected to a wide area network to have the data access ability in the wide area network. Wherein, since the wireless service power supply device 600 of this preferred embodiment establishes a wireless local area network by the Wi-Fi technology, the three electronic devices 700, 800 and 900 also need to have the Wi-Fi function before they are connected to the wireless local area network established by the wireless service power supply device 600 and further connected to the wide area network through the network access device 500.

Figure 5:
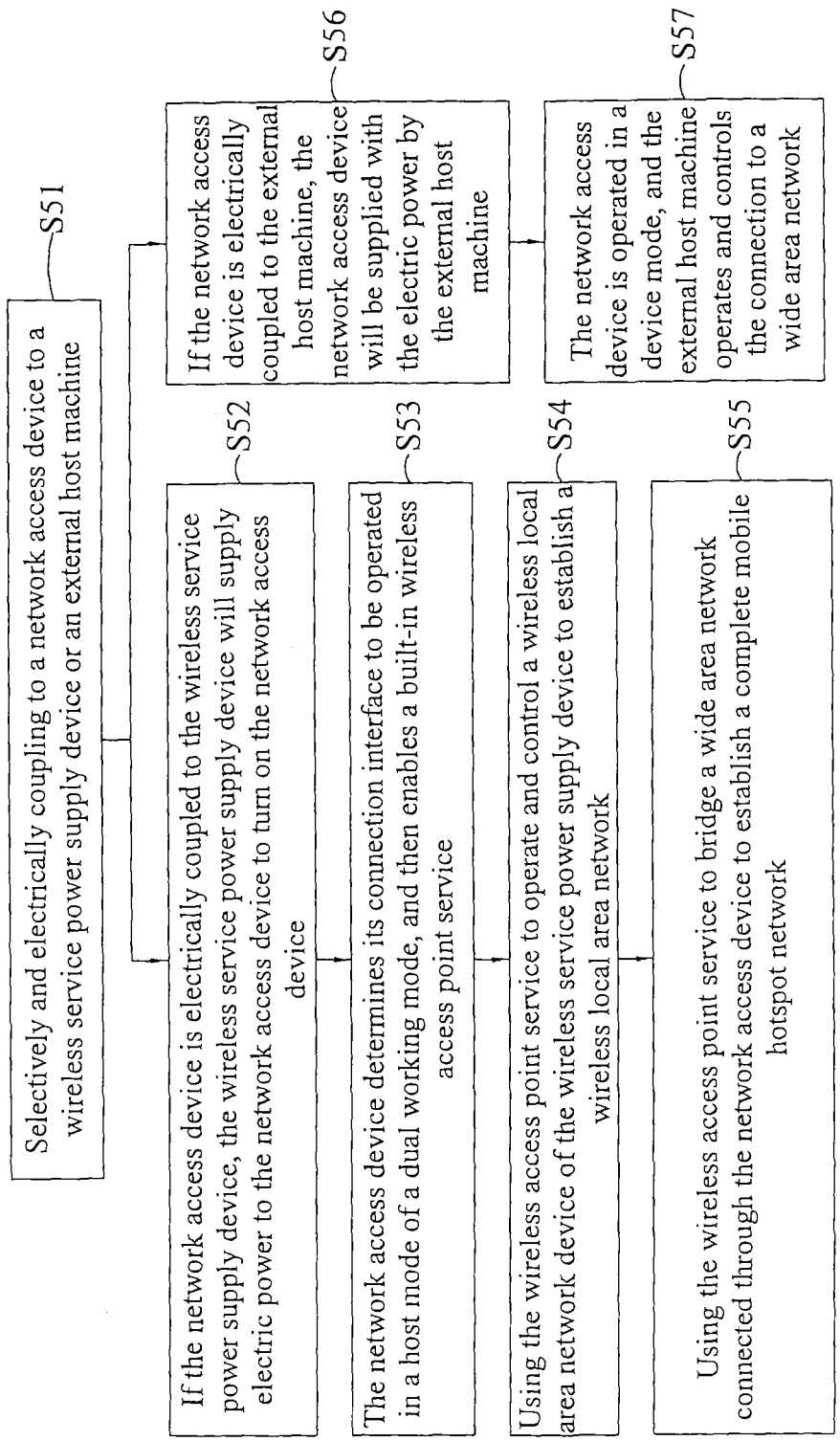
FIG. 5 is a flow chart of a network service provision method of a combinatorial mobile hotspot device of the present invention.

With reference to FIG. 5 for a flow chart of a network service provision method of a combinatorial mobile hotspot device of the present invention, the network service provision method comprises following steps:

S51: Selectively and electrically coupling to a network access device to a wireless service power supply device or an external host machine. Wherein, the network access device is connected to the wireless service power supply device or the external host machine by an interface such as USB, SDIO, HSIC etc.

S52: If the network access device is electrically coupled to the wireless service power supply device, the wireless service power supply device will supply power to the network access device to turn on the network access device.

S53: The network access device determines its connection interface to be operated in a host mode of a dual working mode, and then enables a built-in wireless access point service.

S54: Using the wireless access point service to operate and control a wireless local area network device of the wireless service power supply device to establish a wireless local area network.

S55: Using the wireless access point service to bridge a wide area network connected through the network access device and establish a complete mobile hotspot network, so that a plurality of electronic devices connected to the wireless local area network can be connected to a wide area network indirectly.

S56: If the network access device is electrically coupled to the external host machine, the network access device will be supplied with the power by the external host machine.

S57: The network access device is operated in a device mode, and the external host machine operates and controls the connection to a wide area network.

In summation of the description above, the combinatorial mobile hotspot device of the present invention builds the network communication technology such as 2G, 3G or WIMAX in the network access device of the present invention, and the power supply and the Wi-Fi device in the wireless service power supply device of the present invention. In this way, the network access device and the wireless service power supply device can be operated independently, and the network access device can serve as a device for connecting the wide area network. The wireless service power supply device can serve as a power supply device to supply power and provide the service of connection to the local area network through Wi-Fi. If the network access device and the wireless service power supply device are combined to become a mobile hotspot device, they may serve as a wireless local area network router for providing connection of a plurality of electronic devices of the local area network to a wide area network. The method of installing the WWAN, Wi-Fi and power supply in different devices not only provides a more flexible application, but also expands the power storage capacity of the power supply module of the wireless service power supply device. Therefore, the assembled mobile hotspot device can achieve the effects of providing a longer using time, reducing the electromagnetic interference effectively, improving the poor heat radiation problem, and lowering the manufacturing cost.

While the invention has been described by means of specific embodiments, numerous modifications and variations could be made thereto by those skilled in the art without departing from the scope and spirit of the invention set forth in the claims.

What is claimed is:

1. A combinatorial mobile hotspot device, comprising:
    a wireless service power supply device, comprising:
        a battery unit, supplying power; and
        a wireless local area network transceiver, having a wireless local area network access ability; and
    a network access device, comprising:
        a connection interface unit; and
        a central processing unit, determining the connection interface unit to be operated in a host mode or a device mode of a dual working mode,
    wherein the network access device is selectively and electrically coupled to an external host machine or the wireless service power supply device through the connection interface unit, and has a mobile Internet access ability, connecting to a wide area network, and a wireless access point service, operating and controlling the wireless local area network transceiver;
    wherein, the network access device is operated in the device mode when the network access device is electrically coupled to the external host machine; and the network access device is operated in the host mode when the network access device is electrically coupled to the wireless service power supply device;
    wherein, if the network access device and the external host machine are electrically coupled to each other, the external host machine is connected to the wide area network through the network access device;
    wherein, if the network access device and the wireless service power supply device are electrically coupled to each other, the network access device receives the power supplied by the battery unit and turns on the wireless access point service to operate and control the local area network transceiver to establish a mobile hotspot network, and the mobile hotspot network provides a plurality of electronic devices to exchange data and access to wide area network data.

2. The combinatorial mobile hotspot device of claim 1, wherein the network access device includes a wireless wide area network transceiver connecting to the wide area network.

3. The combinatorial mobile hotspot device of claim 2, wherein the wireless access point service is a software control program coupling with and controlling the wireless local area network transceiver to establish the mobile hotspot network.

4. The combinatorial mobile hotspot device of claim 1, wherein the network access device includes a power management unit receiving the power supplied by the external host machine or the wireless service power supply device.

5. The combinatorial mobile hotspot device of claim 1, wherein the wireless service power supply device further includes a power recharging unit coupled to the battery unit receiving the power supplied by a power supply device and then storing the power into the battery unit.

6. The combinatorial mobile hotspot device of claim 1, wherein the connection interface unit includes a universal serial bus (USB) interface, a secure digital input/output (SDIO) interface or a high speed inter-chip (HSIC) interface.

7. The combinatorial mobile hotspot device of claim 1, wherein the wireless local area network transceiver includes a wireless fidelity (Wi-Fi) protocol.

8. A network service provision method of a mobile hotspot device, comprising:
    providing a wireless service power supply device, the wireless service power supply device comprising a battery unit supplying power and a wireless local area network transceiver having a wireless local area network access ability;
    providing a network access device, the network access device selectively and electrically coupled to an external host machine or the wireless service power supply device, and having a mobile Internet access ability, connecting to a wide area network, and a wireless access point service, operating and controlling the wireless local area network transceiver;
    connecting the external host machine to the wide area network through the network access device if the network access device and the external host machine are electrically coupled to each other; and
    supplying power to the network access device by the battery unit and turning on the wireless access point service to operate and control the local area network transceiver to establish a mobile hotspot network, and providing a plurality of electronic devices to exchange data and access to wide area network data by the mobile hotspot network if the network access device and the wireless service power supply device are electrically coupled to each other,
    wherein the network access device includes a connection interface unit and a central processing unit, and the network access device is electrically coupled to the external host machine or the wireless service power supply device through the connection interface unit, and the central processing unit is provided for determining the connection interface unit to be operated in a host mode or a device mode of a dual working mode;
    wherein, the network access device is operated in the device mode when the network access device is electrically coupled to the external host machine; and the network access device is operated in the host mode when the network access device is electrically coupled to the wireless service power supply device.

9. A network access device, electrically coupled to a wireless service power supply device with a battery unit and a wireless local area network transceiver having a wireless local area network access ability or an external host machine, the network access device comprising:
 a connection interface unit; and
 a central processing unit,
 wherein, if the network access device and the external host machine are electrically coupled to each other, the external host machine is connected to the wide area network through the network access device;
 wherein, if the network access device and the wireless service power supply device are electrically coupled to each other, the network access device receives the power supplied by the battery unit and turns on the wireless access point service to operate and control the local area network transceiver to establish a mobile hotspot network, and the mobile hotspot network provides a plurality of electronic devices to exchange data and access to wide area network data;
 wherein, the network access device is electrically coupled to the external host machine or the wireless service power supply device through the connection interface unit, and the central processing unit is provided for determining the connection interface unit to be operated in a host mode or a device mode of a dual working mode;
 wherein, the network access device is operated in the device mode when the network access device is electrically coupled to the external host machine; and the network access device is operated in the host mode when the network access device is electrically coupled to the wireless service power supply device.

10. The network access device of claim 9, further comprising a power management unit for receiving the power supplied by the battery unit.

11. The network access device of claim 9, wherein the connection interface unit includes a universal serial bus (USB) interface, a secure digital input/output (SDIO) interface or a high speed inter-chip (HSIC) interface.

* * * * *